United States Patent [19]

Ochiai

[11] Patent Number: 4,788,564

[45] Date of Patent: Nov. 29, 1988

[54] BOARD RECORDING APPARATUS WITH REDUCED SMUDGE

[75] Inventor: Toshihiko Ochiai, Tokyo, Japan

[73] Assignee: Canon Kabushiki Kaisha, Tokyo, Japan

[21] Appl. No.: 154,435

[22] Filed: Feb. 9, 1988

Related U.S. Application Data

[63] Continuation of Ser. No. 70,847, Jul. 2, 1987, abandoned.

[30] Foreign Application Priority Data

| | | | |
|---|---|---|---|
| Jul. 10, 1986 | [JP] | Japan | 61-162814 |
| Nov. 25, 1986 | [JP] | Japan | 61-278748 |
| Feb. 4, 1987 | [JP] | Japan | 62-25398 |

[51] Int. Cl.$^4$ ..... G01D 15/06

[52] U.S. Cl. ..... 346/153.1; 346/160.1; 355/15

[58] Field of Search ..... 346/153.1, 160.1, 150; 400/119; 101/DIG. 13; 358/300; 355/3 DD, 14 D, 15

[56] References Cited

U.S. PATENT DOCUMENTS

| | | | |
|---|---|---|---|
| 3,816,840 | 6/1974 | Kotz | 346/74 |
| 3,879,737 | 4/1975 | Lunde | 346/74 |
| 3,914,771 | 10/1975 | Lunde et al. | 346/74 |
| 3,946,402 | 3/1976 | Lunde | 346/74 |
| 4,402,000 | 8/1983 | Fabel et al. | 346/155 |
| 4,418,357 | 11/1983 | Huss | 346/153.1 |
| 4,460,907 | 7/1984 | Nelson | 346/153.1 |
| 4,464,672 | 8/1984 | Lindahl | 346/153.1 |
| 4,493,882 | 1/1985 | Kaneko et al. | 430/97 |
| 4,532,531 | 7/1985 | Lindahl | 346/153.1 |
| 4,547,787 | 10/1985 | Kaneko et al. | 346/160 |
| 4,573,061 | 2/1986 | Fujii et al. | 346/153.1 |
| 4,649,094 | 3/1987 | Tamura et al. | 430/126 |
| 4,686,565 | 9/1987 | Imanaka | 355/15 |

*Primary Examiner*—Arthur G. Evans
*Attorney, Agent, or Firm*—Fitzpatrick, Cella, Harper & Scinto

[57] ABSTRACT

A board recording apparatus in which a recording medium (1) in the form of an endless belt moves sequentially between an image formation station (6) and a charge elimination station (14). A charge elimination electrode (16) at the charge elimination station applied voltages via the residual electrically conductive toner (9) to eliminate charges which otherwise cause toner to adhere and produce smudges in subsequent displays.

15 Claims, 10 Drawing Sheets

BOARD RECORDING APPARATUS WITH REDUCED SMUDGE

This application is a continuation of application Ser. No. 070,847, filed July 2, 1987, now abandoned.

BACKGROUND OF THE INVENTION

1. Field of the Invention

The present invention relates to a board recording apparatus capable of displaying an image such as a manuscript on a vertical plane like a blackboard. More particularly the invention concerns the elimination of smudges caused by previously displayed images on a board recording apparatus.

2. Description of the Related Art

The following is a description of a previously proposed board recording apparatus. As shown in FIG. 6, a board recording apparatus has a recording medium 102 in the form of an endless belt looped around a pair of vertically displaced rollers 100 and 101. An image formation apparatus 103 is disposed ad]acent the outer surface of the belt near the lower roller 101. This image formation apparatus is disclosed in Japanese Patent Publication No. 51-46707 (U.S. Pat. No. 3,914,771) and others; and it is constructed such that an image is produced by applying voltages corresponding to image signals from a recording control portion 105 to a recording electrode 104 and depositing toner onto the thus charged surface of the recording medium 102. The recording medium 102 on which the image is produced, is moved to a display area 106 and displayed. Thereafter, the deposited toner 107 is scraped and removed from the recording medium 102 by a cleaning means 108, to enable a subsequent display on the recording medium.

The above described board recording apparatus has certain problems. As can be seen from FIG. 7A, the image recording process carried out in the apparatus of FIG. 6 comprises the steps of applying predetermined positive voltages to the recording electrode 104, grounding a conductive layer on the back of the recording medium 102, and allowing the toner 107 to become charged to positive polarity so that it becomes deposited on the recording medium 102 as a result of electrostatic forces existing across the thickness of an insulating layer on the front of the recording medium. The toner 107 deposited on the surface of the insulating layer is thereafter scraped and removed by the cleaning means 108. However, if the insulating layer is a dielectric which has a high electrical resistivity or time constant, then the electrostatic charges from the toner 107 do not leak away fully from the insulating layer but instead remain as residual charges 111 (FIG. 7B). When the next image is developed in this circumstance, as shown in FIG. 7C, there arises a problem of smudge in the image on the recording medium 102 because minus charges are induced in the toner due to the residual plus charges in the insulating layer 110; and as a result, toner with a minus charge is deposited on the recording medium 102 in addition to the toner deposited with a plus charge according to a new image. In order to solve this problem, it has previously been proposed to reduce the electrical resistivity of the insulating layer 110. However, this gives rise to another problem, namely an image of low density. This is because when the resistivity of the insulating layer 110 is low, the charges on the toner 107 leak away through the insulating layer 110 and it then becomes difficult to deposit toner on that layer.

SUMMARY OF THE INVENTION

The present invention is directed to overcoming the above described problem of the prior art. Thus, the present invention provides a board recording apparatus which can, without reduction of image density, enable a clear image to be produced.

According to the invention there is provided a board recording apparatus which comprises a recording medium, an image recording station and a charge elimination station. The recording medium has a dielectric layer and an electrically conductive layer on one side of the dielectric layer; and it is mounted for successive movement between the image recording station and the charge elimination station. The image recording station comprises recording electrodes arranged to apply voltages between the conductive layer of the recording medium and electrically conductive toner at selected regions on the other side of the recording medium's dielectric layer to produce charges which cause the toner to adhere to the surface of the dielectric layer according to images to be recorded. The charge elimination station comprises a charge elimination electrode arranged to contact toner remaining on the recording medium. Means are also provided for applying voltages to the charge elimination electrode of a polarity opposite to that applied to the recording electrode.

In one embodiment, the toner is magnetic and the charge elimination electrode is placed on the ends of a plurality of permanent magnets arranged in the form of a bar. In another embodiment, the toner is magnetic and the charge elimination electrode is in the form of a sleeve surrounding an assembly of radially extending permanent magnets. Also, either the sleeve or the assembly of magnets may rotate.

The charge elimination electrode serves to eliminate the residual electrostatic charge which tends to cause the toner to adhere to the recording medium.

DETAILED DESCRIPTION OF THE PREFERRED EMBODIMENTS

Figure 1:
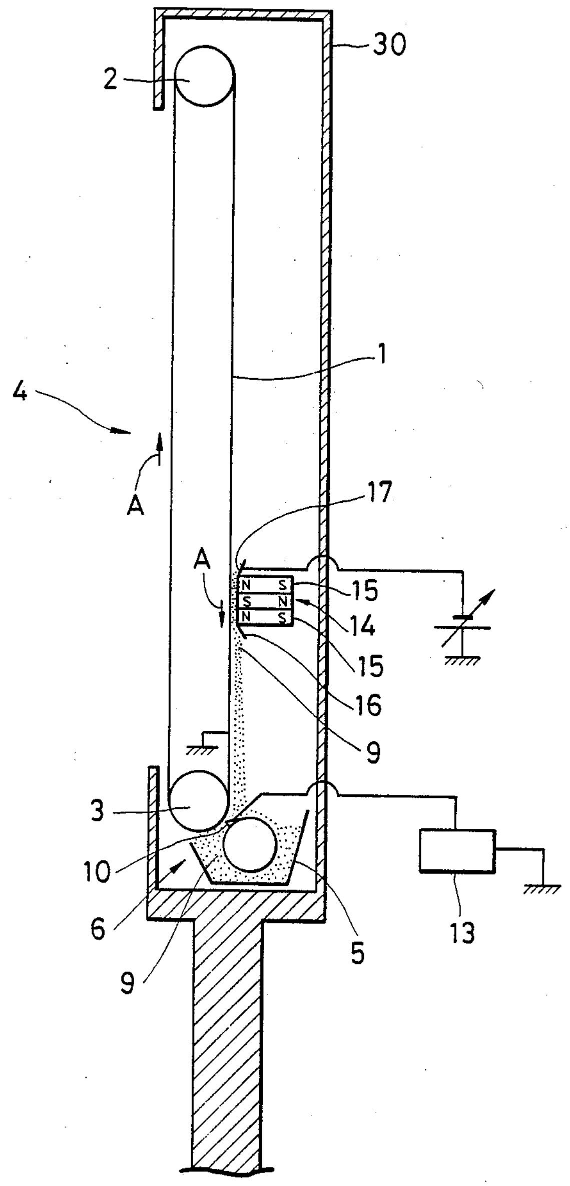
FIG. 1 is a schematic side sectional view showing an embodiment of a board recording apparatus in which the present invention is embodied.

The board recording apparatus of FIG. 1 comprises a recording medium 1 formed as an endless belt looped around a pair of rollers 2 and 3 which are disposed at the upper and lower ends, respectively, of an outer body 30 of the apparatus. The recording medium 1 is supported by the rollers 2 and 3 so as to move around them and pass through a flat vertical display plane at a display station 4. The recording medium 1 is driven in the direction of the arrows A (in FIG. 1) during image formation. At the lowest position of rotating path of the recording medium 1, that is the position adjacent the roller 3, there is provided an image recording station 6. This station records an image by applying voltages through electrically conductive toner 9 to the recording medium 1 at selected locations on the medium corresponding to the image. The toner 9, which is contained in a supply container 5 thus adheres electrostatically to the recording medium 1 in the image areas.

Figure 2:
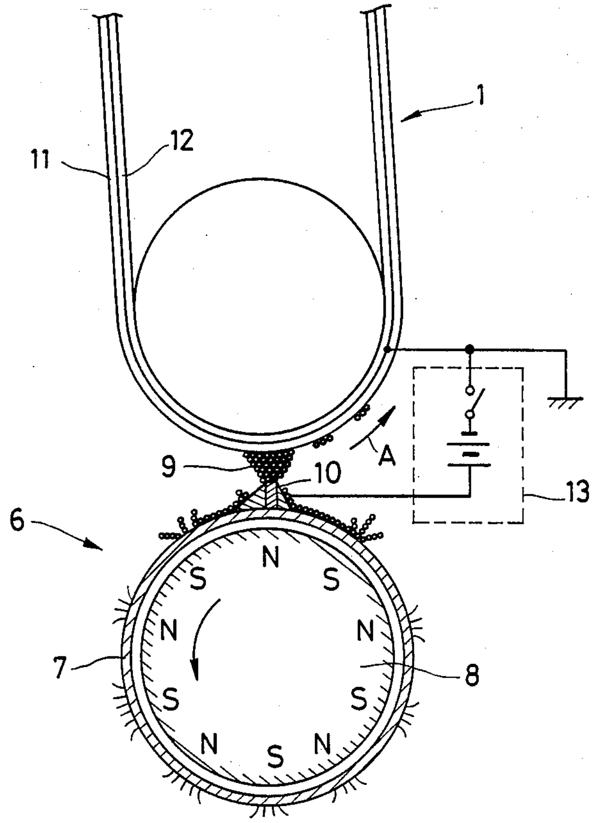
FIG. 2 is an enlarged schematic view showing in section, an image formation means used in the embodiment of FIG. 1;.

The foregoing image production is carried out according to a method called "magnestylus" described in Japanese Patent Publication No. 51-46707 and others. The principle of this method will now be described. As shown in FIG. 2, a cylindrical magnet 8, having alternate north and south poles about its circumference, rotates in a non-magnetic hollow cylinder 7. Electrically conductive magnetic toner 9, pigmented in black or some other color, is carried on the non-magnetic cylinder 7 and then passes onto recording electrodes 10, made of electrically conductive material in the form of styli whch are arranged closely to one another along the non-magnetic cylinder 7 in the direction of its axis. Voltages are applied according to an image pattern between the recording electrodes 10 and a conductive layer 12 on the back side of the recording medium 1. The recording medium 1 also has an insulating layer 11 on its front side. The image is produced or developed by depositing the toner 9 onto the recording medium 1 so that adheres to the medium only in those regions that have an electrostatic charge, i.e. only on those regions of the recording medium 7 to which voltages from the recording electrodes 10 have been applied. The image information to be displayed is applied as electric signals from a recording control portion 13 (FIG. 1) to the recording electrodes 10.

On the side of the recording medium 1 opposite the display station 4 there is provided a charge elimination station including removing means 14 for removing toner 9 deposited on the surface of the recording medium 1. This removing means 14 has a plurality of permanent magnets 15 in the form of a bar and arranged with their polar axes perpendicular to the plane of the recording medium 1 and with adjacent alternate north and south poles in the direction of movement of the medium. On the end of the magnets 15 adjacent to and facing the recording medium, there is provided a plate like charge elimination electrode 16. The distance between the electrode 16 and the recording medium 1 is 50 microns to 5 millimeters, preferably 200 microns to 3 millimeters. This voltage applied to the electrode 16 has a polarity opposite to that applied to the recording electrodes 10.

Figure 3A:
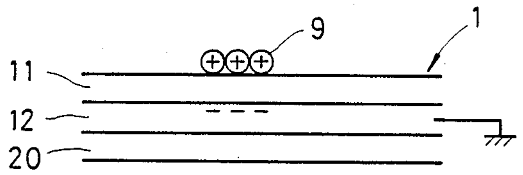
FIGS. 3A to 3D are schematic views showing a section of a recording medium for explaining image elimination according to this invention.
Figure 3B:
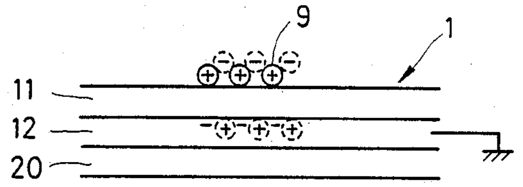
Figure 3C:
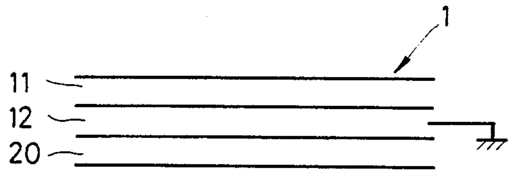
Figure 3D:
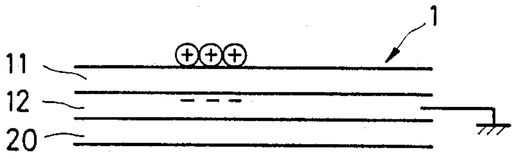

The above described board recording apparatus according to the present invention displays a first image and then may add and display a further image. Thereafter the apparatus cleans off the first image or images, and then adds a further image, and so on. While the recording medium 1 moves at a predetermined velocity, recording voltages $V_R$ of $+30\sim+200$ V in accordance with image information are applied between the recording electrodes 10 and the conductive layer 12 of the recording medium 1, whereby minus charges are induced in the dielectric layer 11; and, as shown in FIG. 3A, toner 9 is deposited on the surface of the recording medium 1 to develop the image at the image producing station 6. The recording medium 1 then moves to the display station 4 where the image is displayed. After display, the image formed on the recording medium 1 moves to the charge elimination station where the image is eliminated by having the recording medium 1 on which toner 9 is deposited move past the eliminating means 14 and by scraping the toner 9 from the surface of the recording medium 1 by means of a toner brush 17 formed on the surface of the electrode 16 of the eliminating means 14. At the same time, a charge elimination voltage $V_E$ of a polarity opposite to that of the recording electrodes 10, is applied to the electrode 16 of the eliminating means 14. This voltage applied to the electrode 16 is in the range of $-100\leqq V\leqq 0$, preferably $-30\leqq V\leqq -5$. This causes the toner on the electrode 16 of the eliminating means 14 to become charged to minus polarity and also causes plus charges to be induced in the dielectric layer 11 as shown in FIG. 3B. Thus, in the dielectric layer 11 of the recording medium 1, plus charges produced at the time of elimination neutralize the minus charges which were produced at the time of development. Consequently, after this charge elimination, no charge remains in the dielectric layer 11 as shown in FIG. 3C; and, at the next development stage, new toner 9 is applied to the recording medium 1 only according to the voltages applied to the recording electrodes 10 as shown in FIG. 3D. Therefore, smudges in the image caused by deposition of excess toner are prevented and a clear image can be obtained.

Figure 4:
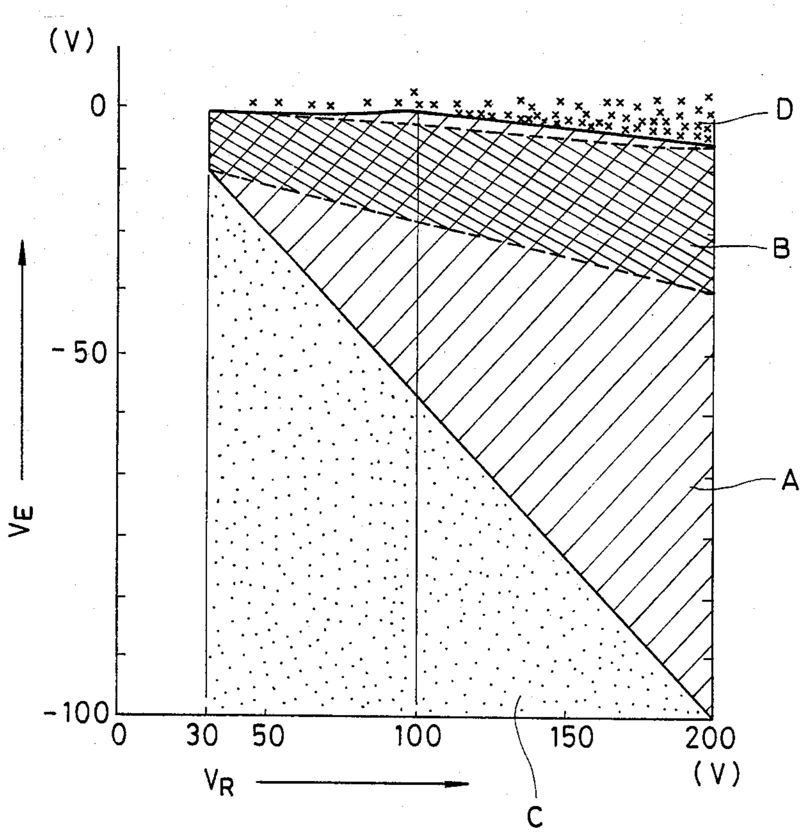
FIG. 4 is a graph showing the smudge eliminating property of the present invention.

In the graph of FIG. 4 the recording voltage $V_R$ applied to the recording electrodes 10 (shown on the horizontal axis) is plotted against the charge elimination voltage $V_E$ applied to the charge elimination electrode 16 (shown on the vertical axis). In this graph, areas A and B represent the ranges of recording and charge elimination voltages which permit smudge reduction; and area B represents the preferred ranges. Area C represents the condition where the reverse voltages applied to the charge elimination electrode 16 are high compared to the voltage applied to the recording electrodes 10. In this case the toner becomes adhered to the recording medium by a reverse electrostatic charge and the smudging problem is not overcome. The area D represents the other extreme where the elimination electrode 16 is insufficient to overcome the electrostatic attraction of the toner to the recording medium. In this case also the smudge problem is not overcome. By way of example when a recording voltage $V_R$ of plus 100 volts is applied to the recording electrodes 10, the charge elimination voltage $V_E$ on the elimination electrode 16 which will elimination smudge is $-47=\leqq V_E \leqq =0$, more preferably $-18 \leqq V_E \leqq 2$. Insufficient smudge elimination arises at the voltage of $-2 < V_E$ and toner deposition due to charge to opposite polarity appears at the voltage of $V_E < -47$.

As can be seen from the graph of FIG. 4 the charge elimination voltage $V_E$ is of a polarity opposite to the recording voltage $V_R$ and has a value within a range whose first limit varies in a straight line from zero to five volts and whose other limit varies in a straight line from ten to one hundred volts as the recording voltage $V_R$ varies from thirty to two hundred volts (areas A and B). Also, it is preferred that the other limit of the range of the charge elimination voltage $V_E$ varies in a straight line from ten to thirty volts as the recording voltage $V_R$ varies from thirty to two hundreds volts (area B).

Figure 5:
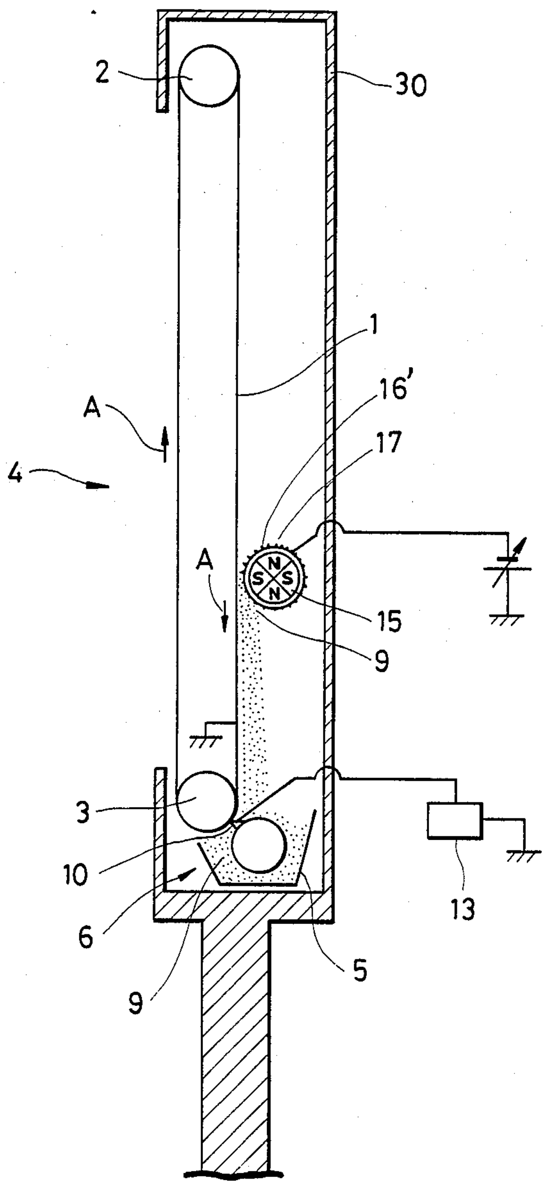
FIG. 5 is a schematic view similar to FIG. 1 but showing another embodiment of the present invention.
Figure 6:
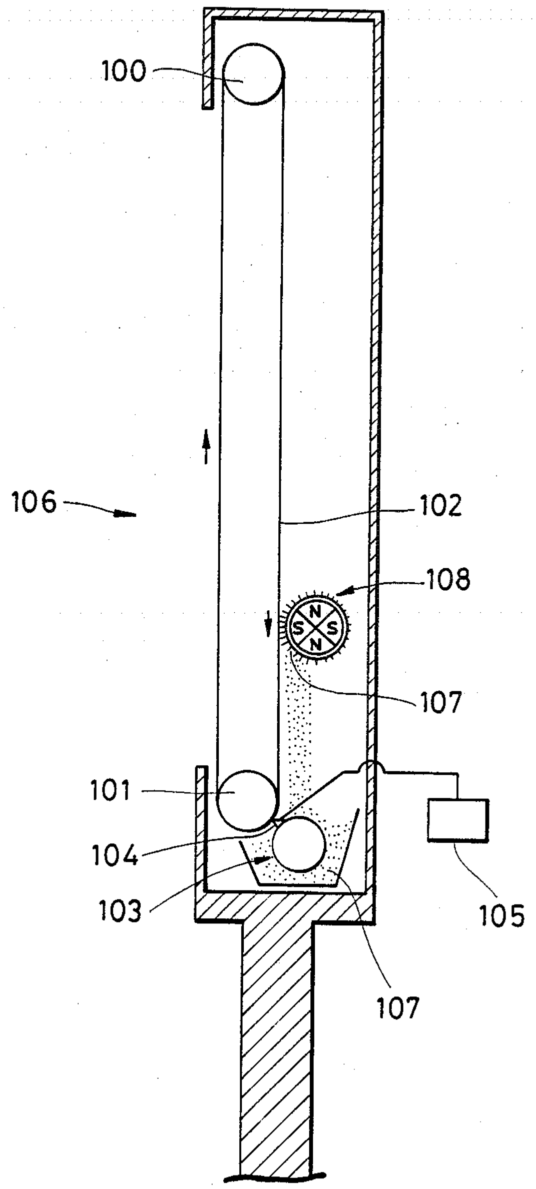
FIG. 6 is a schematic view similar to FIG. 1 but showing still another embodiment.
Figure 7A:
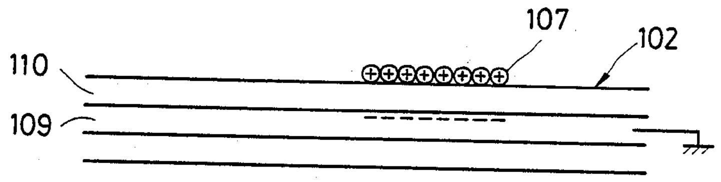
FIG. 7A (PRIOR ART)
FIGS. 7A to 7C are schematic views similar to FIGS. 3A to 3D but showing the development of smudges according to the prior art.
Figure 7B:
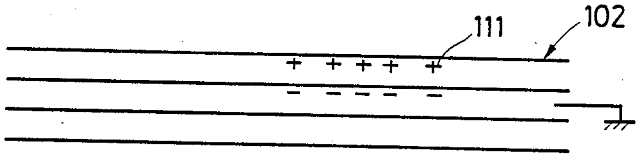
FIG. 7B (PRIOR ART)
Figure 7C:
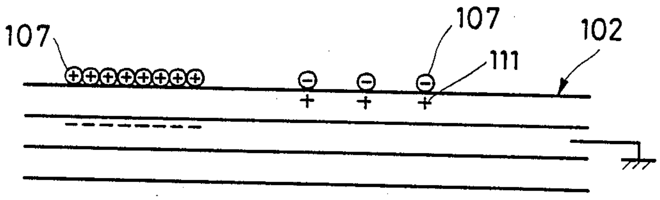
FIG. 7C (PRIOR ART)
Figure 8:
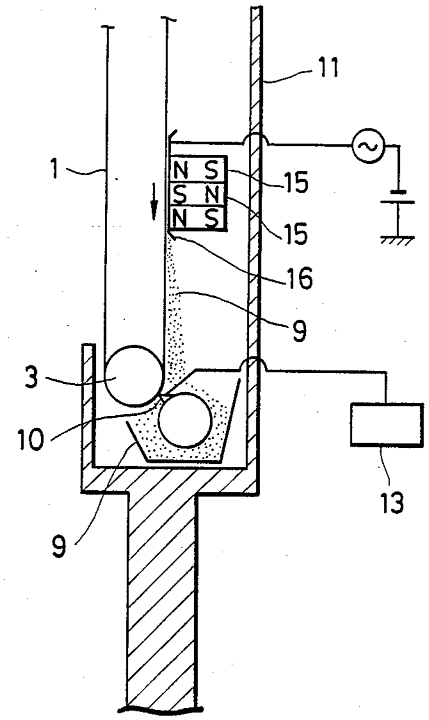
FIG. 8 shows a different embodiment in which an A.C. voltage is applied to the charge elimination electrode.

FIG. 5 shows a further embodiment of the present invention. Portions of this embodiment which correspond to those of FIG. 1 are indicated by the same reference numerals. In the embodiment of FIG. 5, the charge eliminating means is constructed differently from the charge eliminating means in the previous embodiment. As shown in FIG. 5, a charge elimination electrode 16' is provided in the form of a cylindrical sleeve within which an assembly of radially extending permanent magnets 15 are disposed. When either the sleeve electrode 16' or the magnet assembly 15 is made to rotate, a toner brush produced on the surface of the sleeve elctrode 16' revolves. This improves efficiency of the charge elimination. A voltage having a polarity opposite to that of the recording electrodes 10 is applied to the sleeve electrode 16'. The remaining portions of the embodiment of FIG. 5 are the same as those in the embodiment of FIG. 1 and therefore will out be further described.

The volume resistivity of the dielectric layer 1 of the recording medium 7 used in the foregoing embodiments is preferably $10^7 \sim 10^{17}$ ohm centimeters ($\Omega$ cm).

In order to protect the surface of the recording medium from mechanical scratches or stains the recording medium may have a protective layer covering its surface.

In the above described embodiments, plus voltages are applied to the recording electrodes and minus voltages are applied to the electrode 16, 16' of the eliminating means; however, reverse polarities may be used as well. For example, voltages of $-30$ to $-200$ volts may be applied to the recording electrodes and a voltage of $0 < V_E \leqq +100$, preferably $+5 \leqq V_E \leqq =30$, may be applied to the elimination electrodes 16, 16'. In this case, the toner adhering to the recording medium becomes charged negatively.

A description will be made hereinunder as to still another embodiment which employs a different type of the voltage applied to the charge elimination electrode 16 of the removing means.

In the embodiments described before, the voltage applied to the charge elimination electrode has a polarity which is opposite to the polarity of the signal voltage applied to the recording electrode. This, however, is not exclusive and the invention may be carried out by applying an alternating voltage to the charge elimination electrode.

Namely, in this embodiment, a voltage having an alternating component formed by superposing an A.C. voltage to a D.C. voltage is applied to the charge elimination electrode 16 of the removing means 14. It is even possible to apply an A.C. voltage having no D.C. component to the charge elimination electrode. In each case, the A.C. voltage may have a voltage $V_{p-p}$ of 10 to 100 V and a frequency f of 500 Hz to 5 KHz. The D.C. component, when employed, may be formed by applying a D.C. voltage having a voltage $V_{Dc}$ of $+20$ to $-20$ V.

Figure 9:
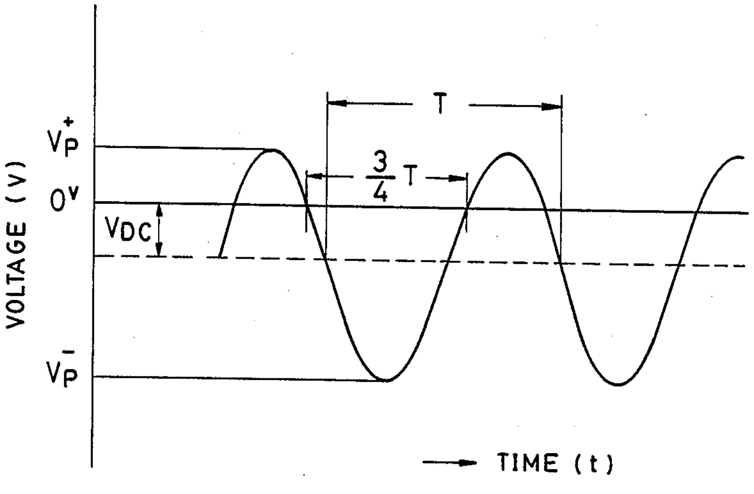
FIG. 9 is a graph showing an example of the voltage applied to the charge elimination electrode in the embodiment shown in FIG. 8.

FIG. 9 shows the waveform of a voltage applied to the charge elimination electrode 16 of the removing means. This voltage has a sine waveform. Peak values of this voltage on the plus (+) side and on the minus (−) side are rspectively represented by $V_p+$ and $V_p-$. Thus, the voltage is expressed by $V_{p-p}=V_p+-V_p-$. When the recording voltage on the recording medium is a positive (plus) voltage, the control is conducted such that the voltage $V_p-$ ($V_p-<0$) is applied to the charge elimination electrode and such that the voltage is held in the negative level for a period which is not shorter than a quarter (¼) of the period of the A.C. voltage.

In this board recording apparatus, the charge elimination operation is conducted in a manner which will be explained hereinunder. As will be seen from FIG. 3*a*, the particles of toner 9 which have been charged in positive polarity during developing attach to the surface of the recording medium 1 in such a manner as to induce negative charges in the conductive layer 12 of the recording medium 1. During the charge elimination operation, the particles of the toner on the recording medium 1 are removed as they are rubbed by the brush of the toner particles formed on the surface of the electrode 16 of the removing means 16. During the charge elimination operation, the electrode 14 is supplied with a voltage of a polarity opposite to that of the recording voltage, so that negative charges are injected into the particles of the toner 9 on the charge elimination electrode 16, while. inducing positive charges in the conductive layer 12 of the recording medium 1, as shown in FIG. 3B. In consequence, the positive charges produced during the development and the negative charges produced during the charge eliminating operation are negated by each other within the electrically conductive layer 12 of the recording medium 1, so that no residual charge is left in the conductive layer 12 of the recording medium 1 after the charge eliminating operation, as shown in FIG. 3C. Therefore, in the next image forming operation, the electrostatic charges attach only to the area which has been electrostatically charged in the new cycle of image forming operation, because there is no residual charge which would attract the toner particles onto the recording medium.

Thus, a voltage V which ranges between 0 and $V_p-$, having the polarity opposite to that of the recording voltage, is applied to the charge elimination electrode 16 of the removing means 14. Therefore, in the event of a change in the resistance values of the toner and the recording medium due to, for example, a change in the environmental condition, such a change in the resistance is absorbed by the value of the A.C. voltage, so that it is not necessary to change the voltage applied to the electrode 16 of the removing means 14.

It is assumed here that the recording medium exhibits a resistance value of $10^8$ Ω-cm, while the toner exhibits a volumetric resistance value of $10^6$ Ω-cm, when the humidity is comparatively high, and that the resistance values are increased, respectively, to $10^{10}$ Ω-cm and $10^6$ Ω-cm, as the humidity becomes low. In such a case, it is possible to eliminate charges satisfactorily without requiring any change in the voltage applied to the charge elimination electrode, if a voltage of a frequency f=1 KHz and having a D.C. component of $V_{DC}=-10$ V and an A.C. component of $V_{p-p}=50$ V is applied to the charge eliminatiOn electrode 16.

The charge elimination electrode of the removing means is supplied with positive voltage for a period which is not longer than $\frac{3}{4}\times T$. When the frequency of the A.C. voltage is not lower than 500 Hz, the exchange of charges is effected rather than the application of the positive charges to the toner, so that the charges in the electrically conductive layer of the recording medium are eliminated, so that the recording medium becomes ready for the next recording operation without holding any residual charge. In contrast, when the frequency of the A.C. voltage is lower than 500 Hz, the charge elimination electrode 16 of the removing means 14 may apply positive charges to the toner, depending on condition such as a large positive value of the voltage $V_p$. In such a case, the charges in the electrically conductive layer in the recording medium cannot be eliminated completely, so that a substantially regular unevenness of toner density is caused in synchronization with the frequency of the A.C voltage.

Although the recording voltage is assumed to be a positive voltage in the foregoing description of the embodiment, it will be clear to those skilled in the art that this embodiment can also be applied to the case where a negative voltage is used as the recording voltage.

It will also be understood that this embodiment, which employs an alternating voltage with or without a D.C. component, can be used in the embodiment shown in FIG. 5 in which a brush of toner moves.

In this embodiment, the charge elimination electrode is supplied with an alternating voltage so that, even when the factors such as resistance value of the recording medium is varied due to a change in the environmental condition, such a variation is effectively absorbed by the amplitude of the alternating current thereby enabling residual charges to be eliminated completely.

A description will be made hereinunder as to the principle of charge elimination means in more detail, with specific reference to FIGS. 10A to 10C. Referring to these Figures, a recording medium 1 is adapted to move in the direction shown by an arrow. The charge elimination means generally includes magnets 15, a non-magnetic backing plate 18, and a charge elimination electrode 16 is grounded and made of a non-magnetic metallic plate. In this embodiment, the charge elimination electrode 16, which is constituted by the grounded non-magnetic metallic plate, is disposed such that a gap of 0.3 mm to 1.2 mm is formed between itself and the recording medium 1. The magnets 15 are arranged such as to develop a magnetic flux of a density on the order of 500 to 1000 Gauss.

Figure 10A:
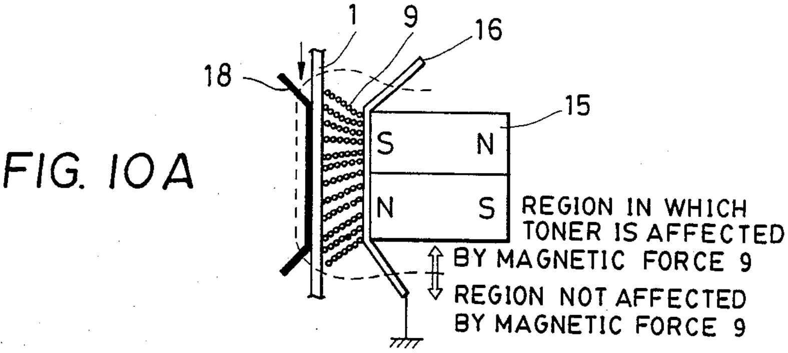
FIGS. 10A to FIG. 10C are illustrations of the charge eliminating operation performed by the removing means in the embodiment shown in FIG. 8.

Referring to FIG. 10A, the gap between the recording medium 1 and the electrode 16 is stuffed with particles of toner which are held by magnetic force. As the recording medium 1 moves from the upper side to the lower side as indicated by the arrow, the toner particles held on the recording medium and forming an image are rubbed by the toner particles with which the gap between the recording medium 1 and the charge elimination electrode 1 is stuffed so that they are scraped off the recording medium. Meanwhile, the electric charges on the recording medium 1 leak through the toner particles which have low electric resistance and then through the grounded charge elimination electrode 16 made of non-magnetic material, so that there is no residual charge on the recording medium coming out the charge elimination station. Although the gap between the recording medium and the non-magnetic electrode of the charge elimination means is stuffed with a large quantity of toner particles, the recording medium 1 is always kept at a constant distance from the charge elimination electrode 16 because it is supported by the backing plate 18.

Figure 10B:
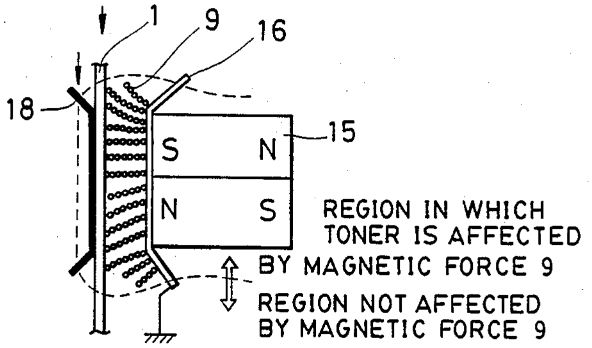
Figure 10C:
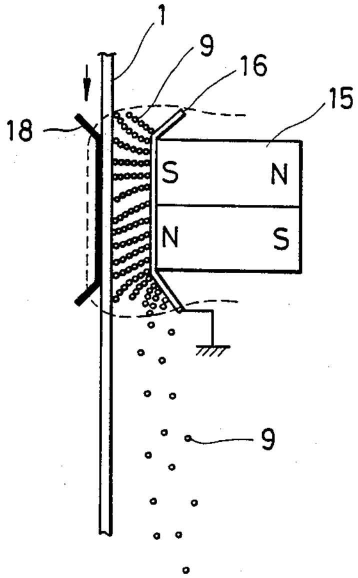

The charge eliminating operation is conducted in the state shown in FIG. 10B. As the recording medium further moves from the upper side to the lower side, the toner particles with which the gap between the recording medium and the charge elimination electrode is stuffed are progressively moved downward by the friction between these toner particles and the recording medium. In the region surrounded by a broken line in FIG. 10B, however, the toner particles stick to one another by the magnetic force and are arrested on the charge elimination electrode due to the magnetic force produced by the magnets 15.

As the recording medium is further moved downward, the toner particles forming the image on the recording medium are successively separated from the recording medium as they are attracted by the magnetic force so that the amount of the toner particles exceed a predetermined capacity which is determined by the distance between the recording medium 1 and the charge elimination electrode 16. In consequence, the toner particles which have stayed in the lower region of the space between the recording medium 1 and the charge elimination electrode 16 in the state shown in FIG. 10A are forced out this region by the toner particles which have been separated from the recording medium and charged into the upper region of the space between the recording medium 1 and the charge elimination electrode, so that these toner particles are allowed to fall freely by the force of gravity. It will be understood that, in the region out of the broken line, the force of the gravity is more influential than the magnetic attracting force, so that the toner particles can drop freely. The thus freed toner particles fall onto the non-magnetic cylinder 7 (see FIG. 2) or onto the recording electrode 10 so as to be used again for the purpose of recording.

It is thus possible to eliminate charges on the recording medium by a very simple arrangement.

Figure 11:
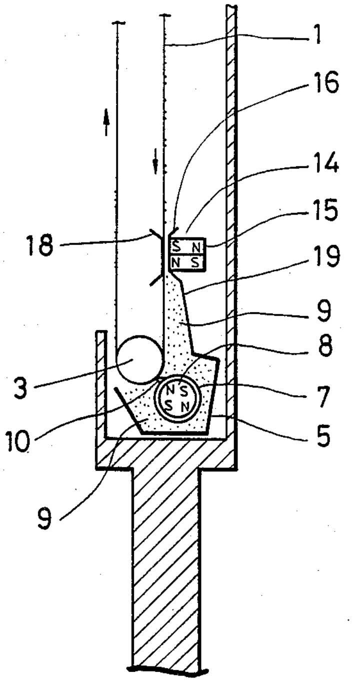
FIG. 11 is a fragmentary sectional view illustrating particularly an anti-scattering plate for preventing the toner from scattering.

In the described arrangement for eliminating charges, it is possible to prevent the falling toner particles from scattering by designing the apparatus such that the distance between the charge elimination station and the recording electrode 10 or the non-magnetic cylinder 7 is sufficiently reduced. It is also possible to provide an anti-scattering member 19 in the path along which the toner particles fall, thereby preventing the toner particles from scattering (see FIG. 11).

When the dielectric layer of the recording medium 1 exhibits a high resistance, there is a risk that a ghost image is formed undesirably due to insufficient leak of the residual charge. This problem, however, can be overcome by applying to the charge elimination electrode 16 a voltage of a polarity opposite to that of the recording voltage.

Figure 12:
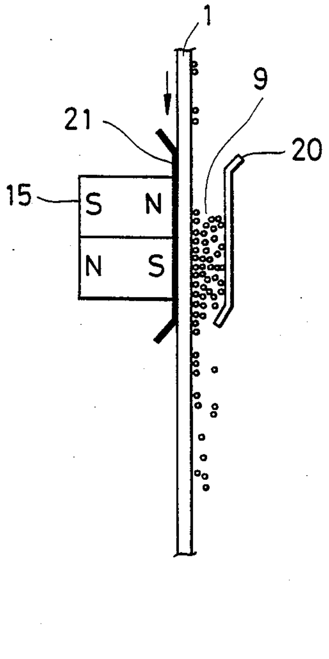
FIG. 12 is a sectional view of another example of the removing means.

FIG. 12 is a sectional view showing a different embodiment. In this embodiment, the magnets 15 are disposed behind the backing plate 21. The particles of the toner 9 rub the recording medium 1 while they are attracted by the magnetic force produced by the magnets 15, so that a high charge elimination effect is attained. In this embodiment, since the toner particles attracted by the magnet 15 tend to be moved together with the recording medium 1, the lower end portion of an opposing plate 20 is bent slightly towards the recording medium 1 so as to be able to retain the toner particles. The illustrated configuration of the opposing plate 20 is only illustrative and may be varied in various forms depending on various factors such as the nature of the surface of the recording medium 1 and arrangement of the magnets 15. The opposing plate 20 may be grounded or may be supplied with a bias voltage as required. The portion of the backing plate 21 which contacts the recording medium 1 is preferably treated so as to reduce the friction between the backing plate 21 and the recording medium 1, e.g., coating with teflon resin.

In the foregoing illustrative embodiments the invention is used in a display apparatus. However, it will be apparent to those skilled in the art that the invention can also be applied to a device wherein the toner image produced on the recording medium is transferred to a transfer material with or without displaying.

According to the foregoing structure and function of the present invention, since it is not necessary to reduce the resistivity of the dielectric layer of the recording medium, a high density image can be maintained and yet complete image elimination after display or transfer can be achieved so that subsequent images will be clear and free of smudges.

What is claimed is:

1. A board recording apparatus comprising a recording medium having a dielectric layer and an electrically conductive layer on one side of the dielectric layer, said recording medium being mounted for successive movement between an image formation station and a charge elimination station, said image formation station comprising recording electrodes arranged to apply voltages between said conductive layer and electrically conductive toner at selected regions on the other side of said dielectric layer to produce charges which cause said toner to adhere to the surface of said dielectric layer according to images to be recorded, said charge elimination station comprising a charge elimination electrode arranged to contact toner remaining on said recording medium and means for applying voltages to said charge elimination electrode of a polarity which may be opposite to that applied to said recording electrodes.

2. A board recording apparatus according to claim 1 wherein said charge elimination electrode is connected to supply charge elimination voltages of polarity opposite to that of said recording electrodes and of a value within a range whose first limit varies in a straight line from zero to five volts and whose other limit varies in a straight line from ten to one hundred volts as the voltage on said recording electrodes varies from thirty to two hundred volts.

3. A board recording apparatus according to claim 1 wherein said charge elimination electrode is connected to supply charge elimination voltages of polarity opposite to that of said recording electrodes and of a value within a range whose first limit varies in a straight line from zero to five volts and whose other limit varies in a straight line from ten to thirty volts as the voltage on said recording electrodes varies from thirty to two hundred volts.

4. A board recording apparatus according to claim 1 wherein the distance between said charge elimination electrode and the recording medium is between fifty microns and five millimeters.

5. A board recording apparatus according to claim 1 wherein the distance between said charge elimination electrode and the recording medium is between two hundred microns and three millimeters.

6. A board recording apparatus according to claim 1 wherein said toner is magnetic and wherein said charge elimination electrode is positioned ad]acent permanent magnets arranged with alternate magnetic poles facing said recording medium.

7. A board recording apparatus according to claim 6 wherein said charge elimination electrode is placed on the ends of a plurality of permanent magnets arranged in the form of a bar.

8. A board recording apparatus according to claim 6 wherein said charge elimination electrode is in the form of a sleeve surrounding an assembly of radially extending permanent magnets.

9. A board recording apparatus according to claim 8 wherein one of said sleeve and said assembly of magnets is rotatable.

10. A board recording apparatus according to claim 1 wherein said recording medium is in the form of an endless belt.

11. A board recording apparatus according to claim 1, wherein said voltage applied to said charge elimination electrode is an alternating voltage.

12. A board recording apparatus according to claim 11, wherein said alternating voltage is composed solely of an A.C. voltage component.

13. A board recording apparatus according to claim 11, wherein said alternating voltage is formed by superposing a D.C. voltage to an A.C. voltage.

14. A board recording apparatus according to claim 1, wherein the magnetic flux density developed on said charge elimination electrode is 500 to 1000 Gauss.

15. A board recording apparatus according to claim 1, wherein said charge elimination electrode is disposed above said image forming station.

* * * * *

UNITED STATES PATENT AND TRADEMARK OFFICE

CERTIFICATE OF CORRECTION

PATENT NO. : 4,788,564

DATED : November 29, 1988

INVENTOR(S) : TOSHIHIKO OCHIAI

It is certified that error appears in the above-identified patent and that said Letters Patent is hereby corrected as shown below:

AT [56] REFERENCES CITED

Line 16, "4,686,565 9/1978 Imanaka" should read --4,696,565 9/1987 Imanaka--.

COLUMN 3

Line 49, "adheres" should read --it adheres--.

COLUMN 5

Line 1, "elimination" should read --eliminate--.
Line 2, "$-47=\leqq V_E \leqq=0$," should read -- $-47\leqq V_E\leqq 0$,-- and "2." should be -- -2.--.
Line 34, "out" should read --not--.
Line 49, "$+5\leqq V_E\leqq=30$," should read --$+5\leqq V_E\leqq+30$,--.

COLUMN 6

Line 5, "$V_{Dc}$" should read --$V_{DC}$--.
Line 11, "rspectively" should read --respectively--.
Line 31, "removing means 16." should read --removing means 14.--.
Line 32, "electrode 14" should read --electrode 16--.

COLUMN 7

Line 4, "eliminatiOn" should read --elimination--.
Line 49, "16 is" should read --16 which is--.
Line 65, "electrode 1" should read --electrode 16--.

UNITED STATES PATENT AND TRADEMARK OFFICE

CERTIFICATE OF CORRECTION

PATENT NO. : 4,788,564

DATED : November 29, 1988

INVENTOR(S) : TOSHIHIKO OCHIAI

It is certified that error appears in the above-identified patent and that said Letters Patent is hereby corrected as shown below:

COLUMN 10

Line 23, "ad]acent" should read --adjacent--.

Signed and Sealed this

Twenty-fourth Day of April, 1990

*Attest:*

HARRY F. MANBECK, JR.

*Attesting Officer*

*Commissioner of Patents and Trademarks*